United States Patent [19]

Fazio

[11] Patent Number: 4,595,704
[45] Date of Patent: Jun. 17, 1986

[54] PREPARATION OF ION-EXCHANGE CATALYSTS

[75] Inventor: Michael J. Fazio, Midland, Mich.

[73] Assignee: The Dow Chemical Company, Midland, Mich.

[21] Appl. No.: 639,980

[22] Filed: Aug. 13, 1984

[51] Int. Cl.$^4$ .................... C08F 5/20; C08C 19/00
[52] U.S. Cl. ............................. 521/31; 521/32; 521/33; 525/383
[58] Field of Search ................... 521/32, 33, 31; 525/383

[56] References Cited

U.S. PATENT DOCUMENTS

| | | |
|---|---|---|
| 2,597,438 | 5/1952 | Bodamer . |
| 2,642,417 | 6/1953 | Wheaton et al. . |
| 3,037,052 | 5/1962 | Bortnick . |
| 3,394,089 | 7/1968 | McNutt et al. . |
| 3,634,341 | 1/1972 | Gammill et al. . |
| 3,676,500 | 7/1972 | Mantell et al. . |
| 3,760,006 | 9/1973 | Gammill et al. . |
| 3,944,561 | 3/1976 | Dubs et al. . |
| 4,053,522 | 10/1977 | McClure et al. . |
| 4,086,274 | 4/1978 | Kaiser et al. . |
| 4,115,297 | 9/1978 | Bolto et al. . |
| 4,191,843 | 3/1980 | Kwantes et al. . |
| 4,239,919 | 12/1980 | Hairston . |
| 4,262,041 | 4/1981 | Eguich et al. . |
| 4,294,995 | 10/1981 | Faler et al. . |
| 4,303,551 | 12/1981 | Vaughan . |
| 4,308,404 | 12/1981 | Kwantes et al. . |
| 4,308,405 | 12/1981 | Kwantes . |
| 4,330,654 | 5/1982 | Ezzell et al. . |
| 4,346,247 | 8/1982 | Faler et al. . |
| 4,365,099 | 12/1982 | Faler et al. . |
| 4,369,293 | 1/1983 | Heydenreich et al. . |
| 4,391,997 | 7/1983 | Mendiratta . |
| 4,396,728 | 8/1983 | Faler . |
| 4,400,555 | 8/1983 | Mendiratta . |
| 4,424,283 | 1/1984 | Faler et al. . |

FOREIGN PATENT DOCUMENTS 0045959 4/1984 European Pat. Off. .

OTHER PUBLICATIONS

The Condensed Chemical Dictionary (9th edition), p. 361.
Morrison & Boyd, *Organic Chemistry*, 2nd edition, p. 670.

Primary Examiner—Joseph L. Schofer
Assistant Examiner—Peter F. Kulkosky
Attorney, Agent, or Firm—Paul D. Hayhurst

[57] ABSTRACT

Partially neutralize a strong-acid cation-exchange resin in acid form using an N-(2-mercaptoalkyl)amide in the presence of water.

20 Claims, No Drawings

PREPARATION OF ION-EXCHANGE CATALYSTS

BACKGROUND OF THE INVENTION

The present invention relates to the preparation of ion-exchange resin catalysts. More specifically, the invention relates to the preparation of partially-neutralized cation-exchange resins.

Ion-exchange resins frequently are employed as catalysts in the preparation of bisphenols from phenol and carbonyl compounds. For example, U.S. Pat. No. 3,394,089 teaches the use of a strong-acid cation-exchange resin partially neutralized with a $C_1$–$C_4$ alkyl mercaptoamine such as 2-mercaptoethylamine (2-aminoethanethiol). Similarly, U.S. Pat. No. 3,760,006 teaches that the modification of an insoluble strong-acid cation-exchange in acid form by partial neutralization with a thiazolidine yields an improved catalyst for the preparation of bisphenols. The latter patent teaches that the thiazolidines easily may be prepared by the reaction of a ketone or aldehyde, $H_2S$, and an aziridine compound. In addition, it is known to prepare the mercaptoamines of the former patent from $H_2S$ and an aziridine, such as ethyleneimine. See, e.g., U.S. Pat. No. 3,944,561 at column 2.

The partially neutralized ion-exchange resin catalysts are useful in the commercial production of bisphenols, especially bisphenol A. Unfortunately, current methods for producing the catalysts described hereinabove employ aziridine compounds which are somewhat hazardous. For example, ethyleneimine is described in *The Condensed Chemical Dictionary* (9th Edition) at page 361 as being highly toxic and corrosive; a dangerous fire and explosion hazard; and a known carcinogen. In view of these hazards, it would be very desirable to prepare said catalysts using a method which would not require the costly and hazardous aziridine compounds.

SUMMARY OF THE INVENTION

The present invention is such a method. According to the present invention, strong-acid cation-exchange resins in acid form can be partially neutralized by contacting the resin with an N-(2-mercaptoalkyl)amide in the presence of water under reaction conditions sufficient to produce an insoluble strong-acid cation-exchange resin in acid form modified by the partial neutralization of its cation-exchange capacity with an aminoalkanethiol. Said modified catalyst can be treated further with an aldehyde or ketone under reaction conditions sufficient to convert the aminoalkanethiol moieties to thiazolidine moieties. The method of the present invention, which employs an amide, is economically advantageous and is less hazardous than the known methods which employ aziridine compounds.

DETAILED DESCRIPTION OF THE INVENTION

The N-(2-mercaptoalkyl)amide can be prepared by known methods, such as that taught in U.S. Pat. No. 4,086,274. The method of said patent employs an oxazoline as a starting material. Thus, by using the relatively less expensive and less hazardous oxazolines as starting material precursors, the present invention advantageously eliminates the use of the costly, hazardous aziridines. Preferred N-(2-mercaptoalkyl)amides are represented generally by the formula:

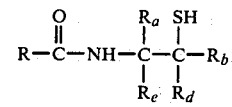

wherein R, $R_a$, $R_b$, $R_d$, and $R_e$ are independently H, alkyl or aryl. Preferably, R is alkyl of from 1 to about 4 carbon atoms. Most preferably, R is ethyl or methyl and $R_a$, $R_b$, $R_d$, and $R_e$ are H. The N-(2-mercaptoalkyl)amide is employed in an amount sufficient to neutralize the desired percentage of the strong-acid moieties of the cation-exchange resin. Typically, about a molar equivalent of N-(2-mercaptoalkyl)amide is employed per equivalent of hydrogen ions to be neutralized.

The process of the present invention can be employed to modify any insoluble strong-acid cation-exchange polymer. Examples of suitable polymers include perfluorinated sulfonic acid resins, strong-acid resins prepared by phosphonation of styrene-divinyl-benzene resins, and polymers such as those disclosed in U.S. Pat. No. 4,303,551 and U.S. Pat. No. 4,330,654. Preferred polymers include aromatic sulfonic acid resins having a cation-exchange capacity of at least 0.5 and advantageously 2.0 or more meq/g dry weight. Commercial strong-acid resins prepared by the sulfonation of a styrene-divinyl-benzene resin, as described for example, by Bodamer in U.S. Pat. No. 2,597,438, by Wheaton and Harrington in U.S. Pat. No. 2,642,417 or by Bortnick in U.S. Pat. No. 3,037,052, are most satisfactory. Such commercial sulfonic acid resins as Dowex ® 50 resin, Amberlite IR-120 resin, Amberlite 200 resin and Duolite C-20 resin, which normally have an exchange capacity of 4.2–5.2 meq/g dry weight, make superior resin catalysts after partial neutralization.

The water employed in the process of the present invention serves as a solvent and serves to convert the N-(2-mercaptoalkyl)amide to the corresponding aminoalkanethiol. Water is employed in an amount sufficient to convert the amide to the corresponding aminoalkanethiol. Typically, from about 0.5 to about 3 volumes of water are employed per volume of resin beads, including void space. Preferably, water and beads are employed in equal volumes. The hydrolysis is substantially quantitative.

The neutralization of the polymer using the N-(2-mercaptoalkyl)amide can be conducted at any combination of temperature and pressure at which the neutralization can proceed and at which the polymer is stable. Typically, the neutralization temperature is from about 80° C. to about 110° C. The neutralization preferably is conducted at reflux temperature.

The extent of the neutralization of the catalyst may vary widely. The resin can be neutralized to any degree which improves the selectivity to the p,p'-bisphenol A isomer versus other isomers. Typically, from about 5 to about 80 mole percent of the strong-acid groups of the cation-exchange resin are neutralized, with the neutralization of 15 to about 40 mole percent of the strong-acid groups being preferred. Particularly effective catalysts are obtained by neutralizing a sulfonated aromatic resin having an initial exchange capacity of about 4.5 to 5.2 meq/g dry weight in acid form giving a modified resin having a capacity of about 3.6 to 4.4 meq/g dry weight in acid form. The degree of neutralization is readily verified by measuring via conventional methods, such as titration using NaOH, the ion-exchange capacity of the resin before and after partial neutralization. For a more detailed description of a typical catalyst which may be produced by the neutralization process of the present invention as described hereinabove see U.S. Pat. No. 3,394,089, the teachings of which are incorporated herein by reference.

The catalyst produced by the method described hereinabove may be contacted with an aldehyde or a ketone to convert the aminoalkanethiol neutralizing moieties to thiazolidine moieties. Thus, this additional step can produce a catalyst such as, for example, those described in U.S. Pat. No. 3,634,341 and U.S. Pat. No. 3,760,006. The teachings of said patents are incorporated herein by reference. Conversion of the aminoalkanethiol-bearing catalyst to the thiazolidine-bearing catalyst is carried out at any combination of temperature and pressure at which the cyclization occurs and at which the polymer is stable. Typically, the cyclization is performed at from about 25° C. to about 50° C. The cyclization can employ any aldehyde or ketone which will cyclize the aminoalkanethiol moiety. Examples of typical aldehydes and ketones include cyclohexanone, methyl ethyl ketone, benzaldehyde, methyl isobutyl ketone, and the like. Acetone is the preferred ketone. The aldehyde or ketone typically is employed in an amount sufficient to cyclize at least some of the aminoalkanethiol moieties of the neutralized catalyst. Preferably, at least about 1 mole of aldehyde or ketone is employed per mole of aminoalkanethiol moiety. Excess aldehyde or ketone can be employed as a solvent for the cyclization.

The partially neutralized cation-exchange resin is an effective catalyst for the preparation of bisphenols using known techniques.

SPECIFIC EMBODIMENTS OF THE INVENTION

The following examples are given to illustrate the invention and should not be construed as limiting its scope. All parts and percentages are by weight unless otherwise indicated.

EXAMPLE 1

A strong-acid cation-exchange resin (200 ml) available from The Dow Chemical Company under the name DOWEX ® 50WX4, having a cation-exchange capacity of approximately 1.24 meq/H+/ml (5.17 meq/g), and 200 ml of deionized water are charged into a glass, round-bottomed flask having a volume of approximately 1 liter. The flask is purged with nitrogen. Then, 6.7 g of N-(2-mercaptoethyl)propionamide are added to the pot with stirring and the slurry is heated to reflux temperature, which is approximately 100° C. Six hours later the reaction mixture is cooled to room temperature and is filtered. The resin is then slurried with 200 ml of water and is filtered. This slurry and filter cycle is repeated four additional times. Analysis of the resin by titration with sodium hydroxide shows that 20 percent of the acid is neutralized with mercaptoethylamine.

EXAMPLE 2

The procedure of Example 1 is repeated except that the resin employed has a cation-exchange capacity of approximately 1.27 meq/H+/ml (5.12 meq/g), and 11.1 g of the amide are charged into the slurry. Analysis of the isolated resin indicates that 34 percent of the acid is neutralized with mercaptoethylamine.

EXAMPLE 3

Water (10 ml), DOWEX ® 50WX4 (10 ml) and 1 ml of N-(2-mercaptoethyl)propionamide are slurried in a round-bottom glass flask and heated to reflux temperature under a blanket of nitrogen. Five hours later, the mixture is cooled to room temperature and filtered. The resin is then washed with 50 ml of water and then with 50 ml of acetone. The resin is then slurried in 25 ml of acetone at room temperature. The resin is allowed to stand in the acetone for 18 hours, and is then filtered.

The formation of dimethylthiazolidine is verified by treating the resin with aqueous sodium hydroxide and extracting the aqueous phase with methylene chloride. The solvent is then removed from the organic phase at reduced pressure using a rotary evaporator. The residue is analyzed by $H^1$-NMR. The spectral data is consistent with that of dimethylthiazolidine.

What is claimed is:

1. A process comprising contacting a strong-acid cation-exchange resin in acid form with an N-(2-mercaptoalkyl)amide in the presence of water under reaction conditions sufficient to produce an insoluble strong-acid cation-exchange resin in acid form modified by the partial neutralization of its cation-exchange capacity with an aminoalkanethiol.

2. The process of claim 1 wherein the resin comprises polystyrene cross-linked with divinylbenzene, the resin having an initial cation-exchange capacity of at least 2.0 meq/g dry resin in acid form.

3. The process of claim 1 wherein the aminoalkanethiol has from 1 to about 4 carbon atoms.

4. The process of claim 3 wherein the aminoalkanethiol is 2-aminoethanethiol.

5. The process of claim 1 wherein the N-(2-mercaptoalkyl)amide has the formula:

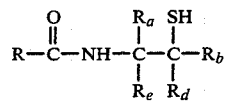

wherein R, $R_a$, $R_b$, $R_d$, and $R_e$ are independently H, alkyl or aryl.

6. The process of claim 5 wherein R is alkyl of from 1 to about 4 carbon atoms.

7. The process of claim 6 wherein R is methyl or ethyl, and $R_a$, $R_b$, $R_d$, and $R_e$ are H.

8. The process of claim 7 wherein R is ethyl.

9. A process comprising
(a) contacting a strong-acid cation-exchange resin in acid form with an N-(2-mercaptoalkyl)amide in the presence of water under reaction conditions sufficient to produce an insoluble strong-acid cation-exchange resin in acid form modified by the neutralization of from about 5 to about 80 mole percent of its cation-exchange capacity with an aminoalkanethiol; and
(b) contacting the partially neutralized resin of (a) with an aldehyde or ketone under reaction conditions sufficient to convert the aminoalkanethiol moieties to thiazolidine moieties.

10. The process of claim 9 wherein an aldehyde is employed in step (b).

11. The process of claim 9 wherein a ketone is employed in step (b).

12. The process of claim 11 wherein the ketone is acetone.

13. The process of claim 9 wherein from about 15 to about 40 mole percent of the cation-exchange capacity of the resin is neutralized.

14. The process of claim 9 wherein the resin comprises polystyrene cross-linked with divinylbenzene, the resin having an initial cation-exchange capacity of at least 2.0 meq/g dry resin in acid form.

15. The process of claim 9 wherein the aminoalkanethiol is 2-aminoethanethiol.

16. The process of claim 9 wherein the N-(2-mercaptoalkyl)amide has the formula:

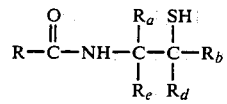

wherein R, $R_a$, $R_b$, $R_d$, and $R_e$ are independently H, alkyl or aryl.

17. The process of claim 16 wherein R is alkyl of from 1 to about 4 carbon atoms.

18. The process of claim 17 wherein R is methyl or ethyl, and $R_a$, $R_b$, $R_d$, and $R_e$ are H.

19. The process of claim 18 wherein R is ethyl.

20. A process comprising contacting a strong-acid polystyrene cross-linked with divinylbenzene cation-exchange resin in acid form with N-(2-mercaptoethyl)-propionamide in the presence of from about 0.5 to about 3 volumes of water per volume of resin under reaction conditions sufficient to produce an insoluble strong-acid cation-exchange resin in acid form modified by the neutralization of from about 5 to about 80 percent of its cation-exchange capacity with 2-aminoethanethiol moieties.

* * * * *